(12) United States Patent
Gwon

(10) Patent No.: US 11,662,884 B2
(45) Date of Patent: May 30, 2023

(54) PERSONAL CHARACTERISTIC EVALUATION SYSTEM AND EVALUATION METHOD

(71) Applicant: Oh Gyoung Gwon, Seoul (KR)

(72) Inventor: Oh Gyoung Gwon, Seoul (KR)

(*) Notice: Subject to any disclaimer, the term of this patent is extended or adjusted under 35 U.S.C. 154(b) by 0 days.

(21) Appl. No.: 17/292,227

(22) PCT Filed: Aug. 9, 2019

(86) PCT No.: PCT/KR2019/010057
§ 371 (c)(1),
(2) Date: May 7, 2021

(87) PCT Pub. No.: WO2020/096173
PCT Pub. Date: May 14, 2020

(65) Prior Publication Data
US 2021/0326012 A1    Oct. 21, 2021

(30) Foreign Application Priority Data
Nov. 9, 2018 (KR) .................. 10-2018-0137184

(51) Int. Cl.
*G06F 3/0482* (2013.01)
*G06F 3/04847* (2022.01)
*G06F 3/04883* (2022.01)

(52) U.S. Cl.
CPC ........ *G06F 3/0482* (2013.01); *G06F 3/04847* (2013.01); *G06F 3/04883* (2013.01)

(58) Field of Classification Search
CPC . G06F 3/0482; G06F 3/04847; G06F 3/04883
See application file for complete search history.

(56) References Cited

U.S. PATENT DOCUMENTS

2005/0283466 A1* 12/2005 Dettinger ............ G06F 16/2425
2012/0096362 A1* 4/2012 Buyukkokten ........ G06Q 50/01
715/733

(Continued)

FOREIGN PATENT DOCUMENTS

JP    2007-299356    11/2007
JP    2010-055327    3/2010

(Continued)

OTHER PUBLICATIONS

International Search Report, with English translation, for International Application No. PCT/KR2019/010057, dated Nov. 19, 2019.

(Continued)

*Primary Examiner* — Jennifer N Welch
*Assistant Examiner* — Ashley M Fortino
(74) *Attorney, Agent, or Firm* — Kile Park Reed & Houtteman PLLC

(57) ABSTRACT

An evaluation system for personal characteristics is provided. There is disclosed an evaluation system for personal characteristics installed in a mobile terminal of a user through an application including: an evaluation target selection unit displaying a plurality of stored profile information so that the user selects an evaluation target; an evaluation item unit including a reference point and a plurality of characteristic items so that the user selects a characteristic for an action of the evaluation target and gives a score; and a data storage unit storing the characteristic and the score of the evaluation target given by the user in the evaluation item unit, wherein in the evaluation item unit, a characteristic item and a score of the evaluation target are given by performing a drag from the reference point toward a corresponding characteristic item by the user through a user's finger or a touch pen.

11 Claims, 8 Drawing Sheets

(56) References Cited

U.S. PATENT DOCUMENTS

| | | | | |
|---|---|---|---|---|
| 2012/0109945 A1* | 5/2012 | Lapko | ................. | G06F 16/9577 |
| | | | | 707/723 |
| 2012/0278825 A1* | 11/2012 | Tran | ...................... | G06Q 30/04 |
| | | | | 725/13 |
| 2014/0181671 A1* | 6/2014 | Dewhurst | ............... | G06F 3/017 |
| | | | | 715/722 |
| 2014/0359789 A1* | 12/2014 | Pitt | ........................ | G06F 21/62 |
| | | | | 726/28 |
| 2015/0281344 A1* | 10/2015 | Grootwassink | ....... | H04L 9/0827 |
| | | | | 713/168 |
| 2019/0130512 A1* | 5/2019 | Kuhn | ..................... | H04L 67/00 |

FOREIGN PATENT DOCUMENTS

| | | |
|---|---|---|
| KR | 10-1691220 | 12/2016 |
| KR | 10-2017-0013966 | 2/2017 |
| KR | 10-1882105 | 7/2018 |

OTHER PUBLICATIONS

Written Opinion, with English translation, for International Application No. PCT/KR2019/010057, dated Nov. 19, 2019.

* cited by examiner

PERSONAL CHARACTERISTIC EVALUATION SYSTEM AND EVALUATION METHOD

CROSS-REFERENCE TO RELATED APPLICATION(S)

This application is a national entry of International Application No. PCT/KR2019/010057, filed on Aug. 9, 2019, and based on and claims priority under 35 U.S.C. § 119 to Korean Patent Application No. 10-2018-0137184, filed on Nov. 9, 2018, in the Korean Intellectual Property Office, the disclosure of which is incorporated by reference herein in its entirety.

BACKGROUND

Field

The present disclosure relates to an evaluation system for personal characteristics and an evaluation method thereof.

Description of the Related Art

In general, in a method of giving or setting a score to a counterpart through an application of a mobile terminal, a manner of directly recording a score in a corresponding item has been selected. However, the score may be erroneously given due to the recording of an erroneous numeral in a process of inputting the score, and the mobile terminal should be touched several times in order to input an evaluation item and score. Therefore, an evaluation system and an evaluation method capable of giving an evaluation score in a more convenient manner is required.

SUMMARY

The present disclosure provides an evaluation system for personal characteristics capable of evaluating personal characteristics and easily giving a score, and an evaluation method thereof.

According to an embodiment of the present disclosure, an evaluation system for personal characteristics installed in a mobile terminal of a user through an application includes: an evaluation target selection unit displaying a plurality of stored profile information so that the user selects an evaluation target; an evaluation item unit including a reference point and a plurality of characteristic items so that the user selects a characteristic for an action of the evaluation target and gives a score; and a data storage unit storing the characteristic and the score of the evaluation target given by the user in the evaluation item unit, wherein in the evaluation item unit, a characteristic item and a score of the evaluation target are given by performing a drag from the reference point toward a corresponding characteristic item by the user through a user's finger or a touch pen.

The evaluation item unit may vary the score according to a length or the number of times of the drag.

The evaluation item unit may further include a memo recording unit recording a feature of the evaluation target as a text.

The data storage unit may include a data conversion unit converting stored data into public information.

According to another embodiment of the present disclosure, an evaluation method of an evaluation system for personal characteristics includes: selecting an evaluation target by executing an application of the evaluation system for personal characteristics through a mobile terminal and confirming a plurality of profile information stored in a target selection unit by a user; selecting a characteristic for an action of the evaluation target and giving a score through an evaluation item unit including a reference point and a plurality of characteristic items by the user; and storing the characteristic and the score given to the evaluation target in a data storage unit, wherein in the selecting of the characteristic for the action of the evaluation target and the giving of the score, a characteristic item and a score of the evaluation target are given by performing a drag from the reference point toward a corresponding characteristic item by the user through a user's finger or a touch pen.

BRIEF DESCRIPTION OF THE DRAWINGS

The above and/or other aspects of the disclosure will be more apparent by describing certain embodiments of the disclosure with reference to the accompanying drawings, in which.

DETAILED DESCRIPTION

Figure 1:
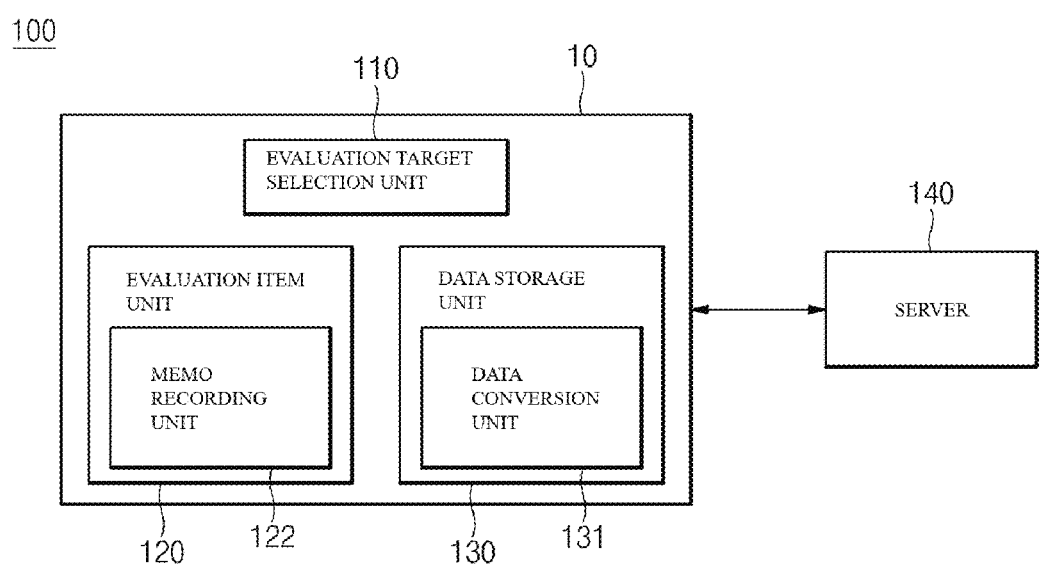
FIG. 1 is a block diagram illustrating an evaluation system for personal characteristics according to an embodiment in the present disclosure.

Hereinafter, exemplary embodiments of the present disclosure will be described in detail with reference to the accompanying drawings.

Embodiments of the present disclosure will be provided only in order to further completely describe the present disclosure to those skilled in the art, the following embodiments may be modified into several other forms, and the scope of the present disclosure is not limited to the following embodiments. Rather, these embodiments make the present disclosure thorough and complete, and are provided in order to completely transfer the spirit of the present disclosure to those skilled in the art. In addition, in the drawings, like reference numerals denote like elements. As used in the present specification, a term "and/or" includes any one of corresponding enumerated items and all combinations of one or more of the corresponding enumerated items.

Figure 2:
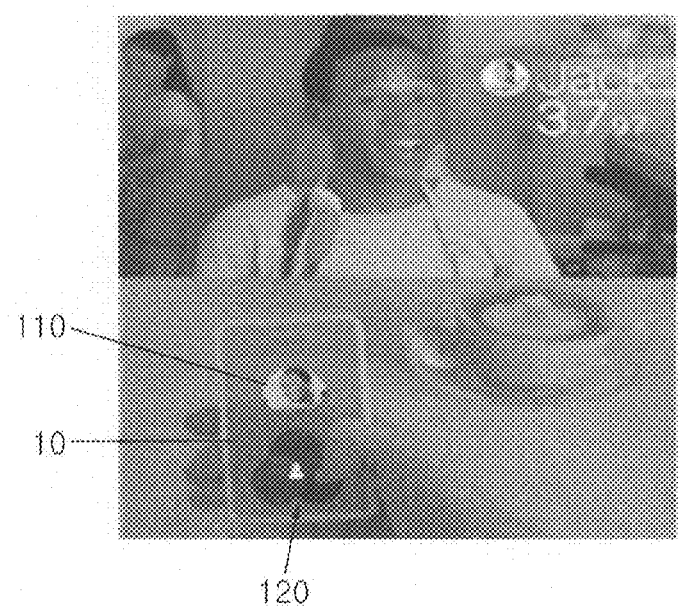
FIG. 2 is a schematic configuration diagram illustrating a state in which the evaluation system for personal characteristics according to an embodiment of the present disclosure is executed.
Figure 3A:
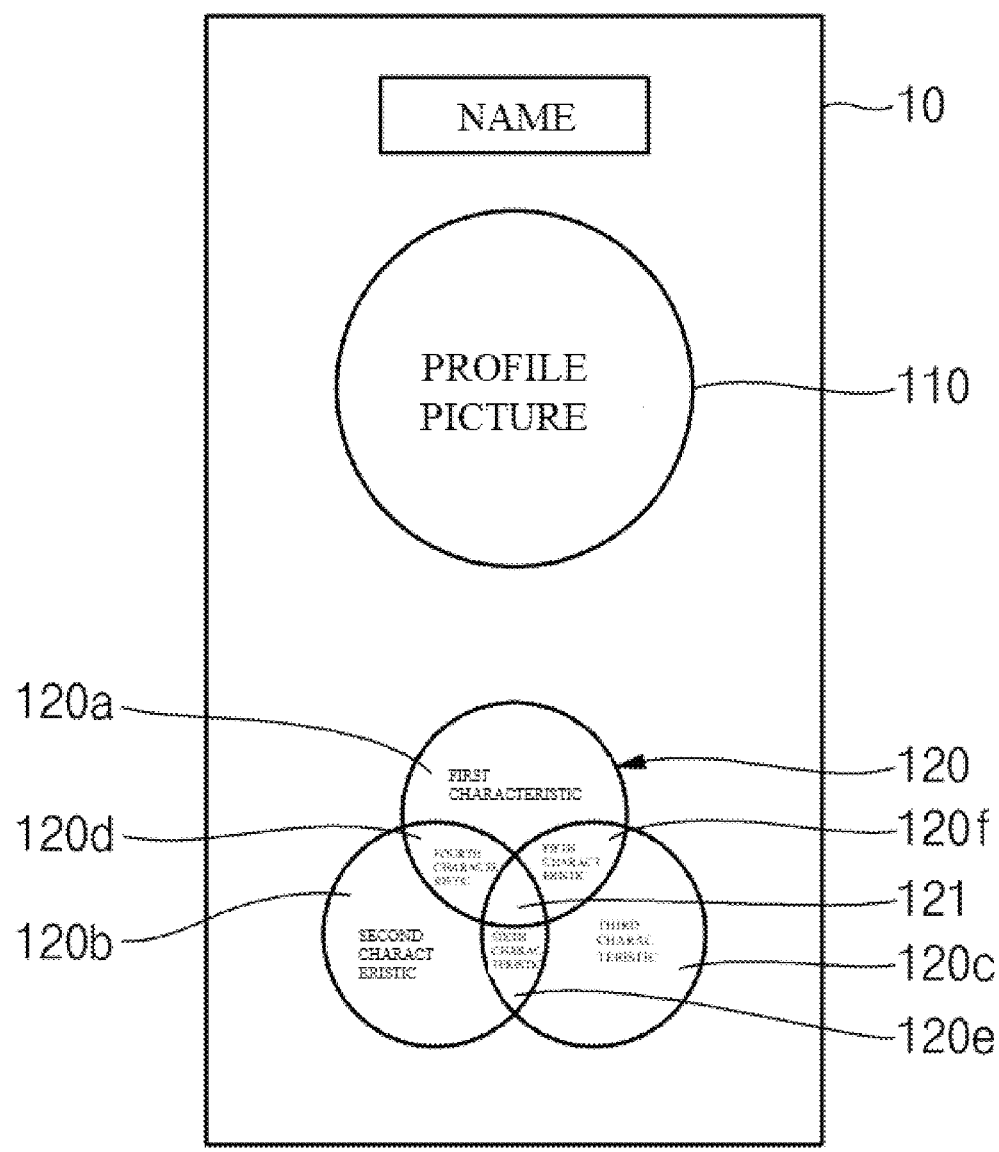
FIG. 3A is a view illustrating a state in which the evaluation system for personal characteristics according to an embodiment of the present disclosure is executed on a mobile phone.
Figure 3B:
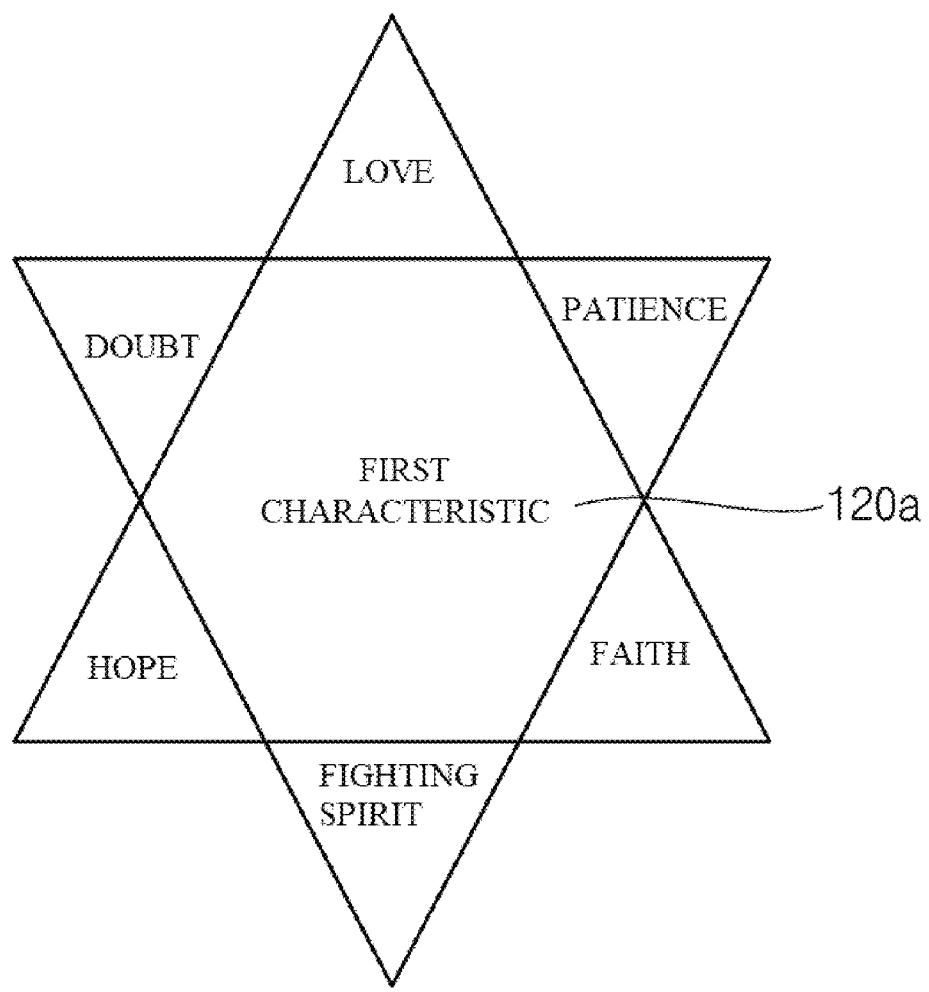
FIG. 3B is a view illustrating detailed evaluation items of a first characteristic.

FIG. 1 is a block diagram illustrating an evaluation system for personal characteristics according to an embodiment in the present disclosure. FIG. 2 is a schematic configuration diagram illustrating a state in which the evaluation system for personal characteristics according to an embodiment of the present disclosure is executed. FIG. 3A is a view illustrating a state in which the evaluation system for personal characteristics according to an embodiment of the present disclosure is executed on a mobile phone. FIG. 3B is a view illustrating detailed evaluation items of a first characteristic.

Referring to FIGS. 1 and 2, the evaluation system 100 for personal characteristics according to an embodiment of the present disclosure includes an evaluation target selection unit 110, an evaluation item unit 120, a data storage unit 130, and a server 140.

The evaluation system 100 for personal characteristics according to an embodiment of the present disclosure may be installed in a mobile terminal 10, for example, a mobile phone, of a user through a dedicated application. The present disclosure premises that a user and an evaluation target are registered as members of the dedicated application. In addition, the evaluation system 100 for personal characteristics according to an embodiment of the present disclosure is a system in which the user gives a characteristic and a score for a certain action when the evaluation target takes the certain action. Here, the action taken by the evaluation target may be an action that helps another person, such as picking up trash or helping a person carrying a heavy burden, or may be an action that harms another people, such as using violence against a counterpart or destroying property.

First, the user may execute the application and select an evaluation target of which characteristics are to be evaluated through the evaluation target selection unit 110. Specifically, when the user touches the evaluation target selection unit 110, the evaluation target selection unit 110 may display profile information of a plurality of members. The user may select the evaluation target by comparing the profile information, for example, a profile picture, provided by the evaluation target selection unit 110 with the evaluation target. In this case, the evaluation target selection unit 110 may display profile information of members positioned within a predetermined radius on the basis of the mobile phone 10 of the user using a global positioning system (GPS) function of the mobile phone 10.

The evaluation item unit 120 may classify personal characteristics into a plurality of items and display the plurality of items. As illustrated in FIG. 3A, the evaluation item unit 120 may include first to sixth characteristics 120a to 120f items. For example, the first to sixth characteristics 120a to 120f items may represent spirit, humility, resentment, sadness, moderation, and suffering, respectively. In addition, each of the first to sixth characteristics 120a to 120f items may further include detailed evaluation items. For example, as illustrated in FIG. 3B, the first characteristic 120a may be classified into love, doubt, hope, fighting spirit, faith, and patience in detail. Similarly, each of the second to sixth characteristics may also include detailed evaluation items.

Figure 4A:
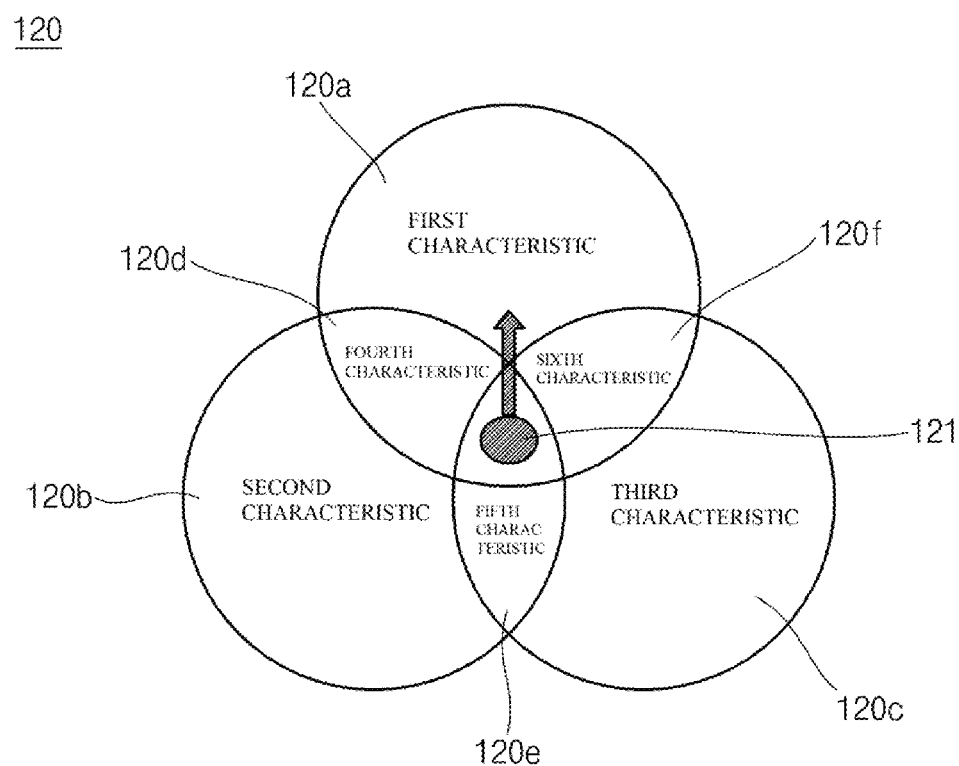
FIGS. 4A and 4B are views for describing a method of giving a score to each characteristic in an evaluation item unit.
Figure 4B:
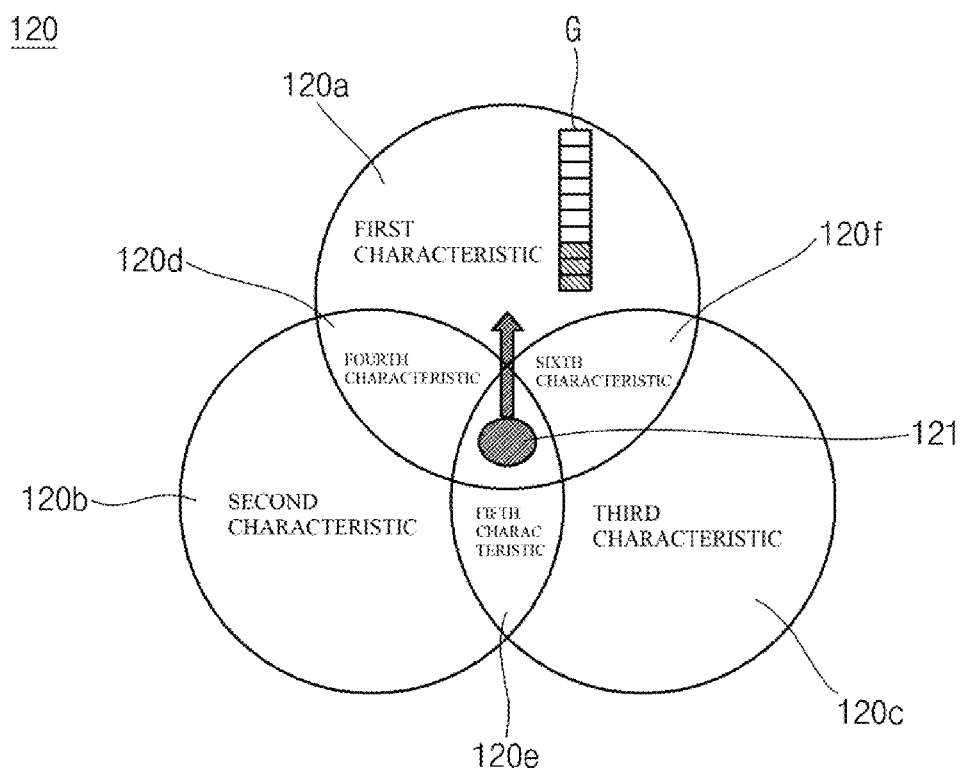

FIGS. 4A and 4B are views for describing a method of giving a score to each characteristic in an evaluation item unit.

A reference point 121 is formed in the center of the evaluation item unit 120, and when the user performs a drag from the reference point 121 toward a corresponding characteristic, a characteristic and a score for the evaluation target may be given. For example, as illustrated in FIG. 4A, when the user thinks that an action of the evaluation target corresponds to the first characteristic 120a, the user may select the first characteristic 120a by performing a drag from the reference point 121 toward the first characteristic (in an arrow direction) through his/her finger or a touch pen. Next, as illustrated in FIG. 4B, when the user performs the drag to roll over to the first characteristic 120a, a separate score gauge G is displayed on a screen, and the user may perform drag-out through his/her finger or the touch pen to fill blanks of the score gauge, thereby giving a score for the first characteristic 120a. For example, when the user fills three blanks in the score gauge G, three points are increased as a score for the first characteristic 120a of the evaluation target. Of course, the score gauge G may also include a negative range.

Figure 5:
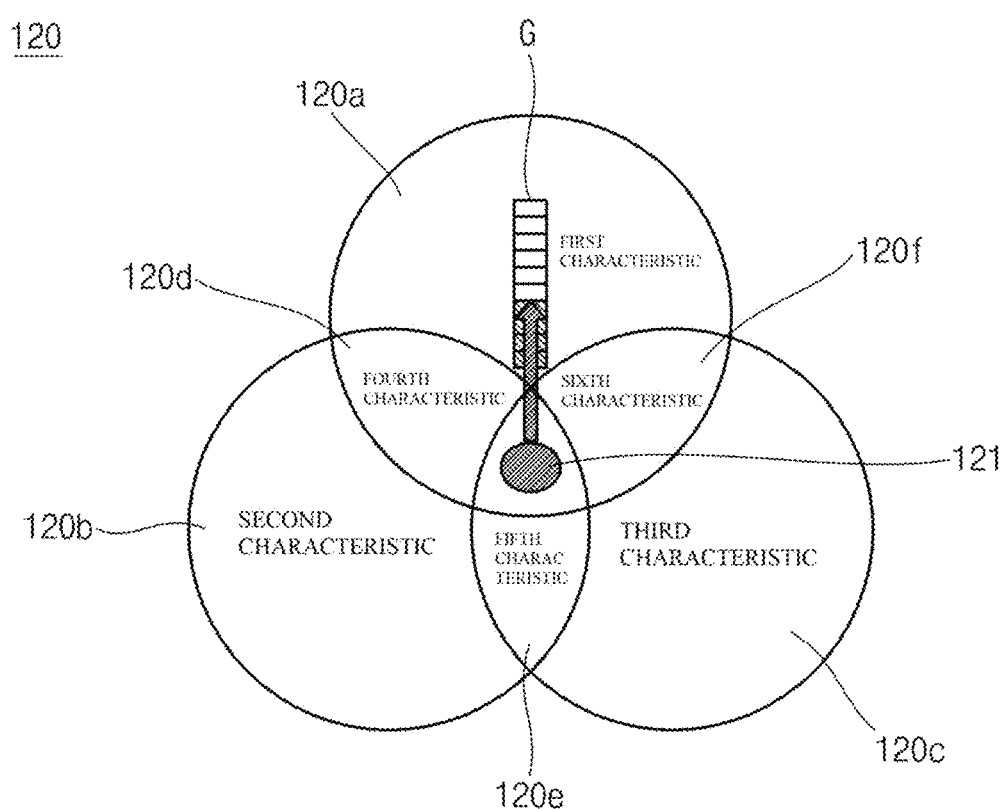
FIG. 5 is a view for describing another method of giving a score to each characteristic in the evaluation item unit.

FIG. 5 is a view for describing another method of giving a score to each characteristic in the evaluation item unit.

In another example, the method illustrated in FIGS. 4A and 4B is not divided, and may be continuously performed. Specifically, as illustrated in FIG. 5, the score gauge G of the first characteristic 120a may be set to rise at the moment when the user performs a drag in the evaluation item unit 120 to change a region from the reference point 121 to the first characteristic 120a. In this case, the score gauge G may be changed according to a degree of drag in the first characteristic 120a. In other words, a score may be set to rise as a distance from the reference point 121 increases. As another example, the evaluation item unit 120 may be set to change the score gauge G according to the number of times by which a drag is performed from the reference point 121 to the first characteristic 120a. In addition, the evaluation item unit 120 changes a background color of the corresponding characteristic region to become darker as the score of the corresponding characteristic rises, such that the user may visually confirm an accumulative numerical value of the corresponding characteristic items without selecting the respective characteristic items one by one. Therefore, the evaluation item unit 120 may give the corresponding characteristic and the score for the corresponding characteristic with only one drag, and user's convenience may thus be increased.

In general, a score evaluation method in the application is performed in a manner in which the user directly designates an item and recording a score. However, in the present disclosure, it becomes possible to give the evaluation items and the scores at a time by simply performing the drag. Therefore, it becomes possible to improve user's convenience by adopting a fast and convenient method in the evaluation method.

In addition, the evaluation item unit 120 may further include a memo recording unit 122. The user may record information on the evaluation target as a text in the memo recording unit 122. As an example, when the evaluation item unit 120 is pressed for a predetermined time or longer, the memo recording unit 122 is executed on a screen of the mobile phone 10, such that the user may record episodes or characteristic points on the evaluation target as a text. Here, the memo recording unit 122 may be executed when the reference point 121 of the evaluation item unit 120 is pressed for about three seconds or more. As another example, when the evaluation item unit 120 is doubly touched, the memo recording unit 122 may be executed on the screen of the mobile phone. In this way, records evaluated by the evaluation item unit 120 are stored in the data storage unit 130.

In addition, the data storage unit 130 further includes a data conversion unit 131 capable of converting stored data into public information. When the user converts the stored data into the public information through the data conversion unit 131, evaluation data may be shared among members. In other words, contents evaluated by the user may be viewed by other members. In addition, data between other members for one evaluation target may be collected and stored in the server 140.

Figure 6:
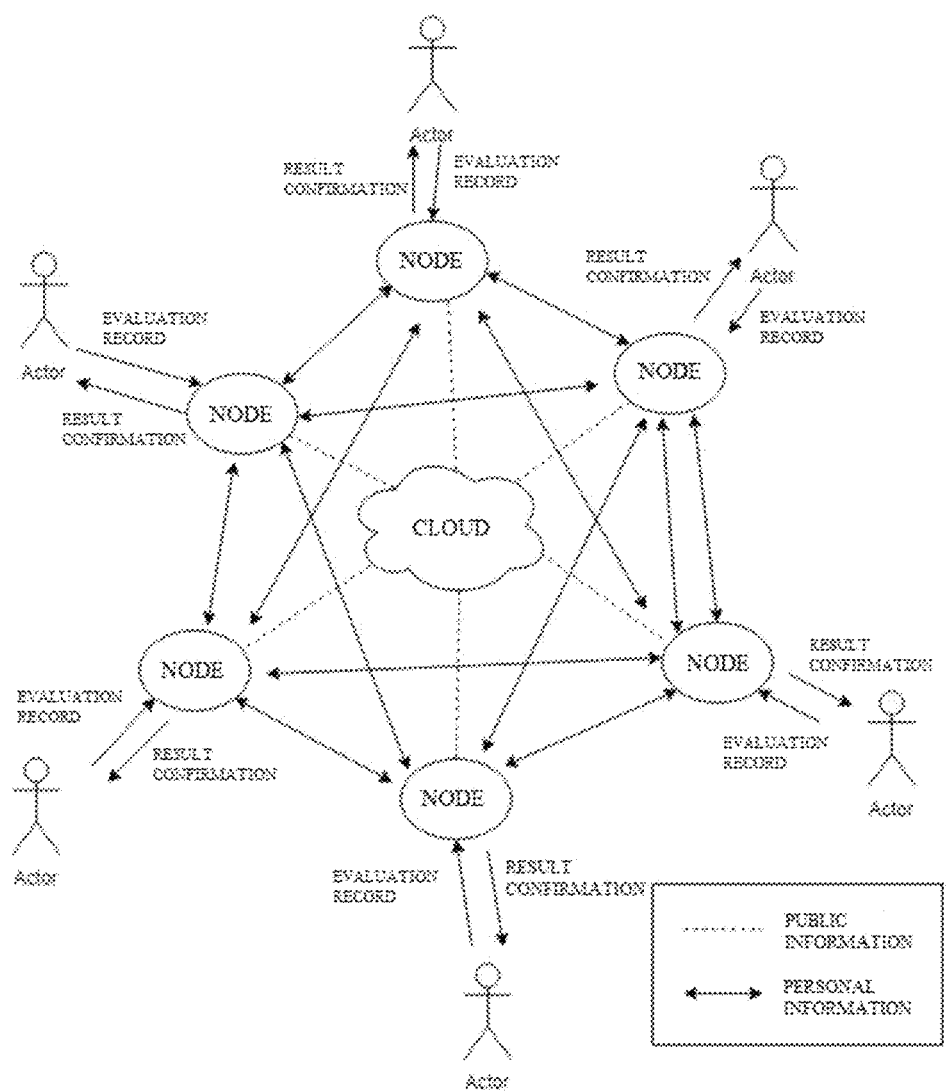
FIG. 6 is a schematic view illustrating an interconnection relationship of the evaluation system for personal characteristics according to an embodiment in the present disclosure.

FIG. 6 is a schematic view illustrating an interconnection relationship of the evaluation system for personal characteristics according to an embodiment in the present disclosure.

Referring to FIG. 6, evaluation records of the evaluation target are stored in mobile phones of users, and when the users convert the stored data from private information to public information, the public information may be shared over a network. In this case, the mobile phone of each of the users acts as a node, and the public information is stored in and is available from a cloud of a server. Therefore, information on personal characteristics of a plurality of members may be shared through the network, and relationship data between individuals may be formed. In addition, an average value, an accumulative score and the like of a plurality of evaluation scores for an individual may also be confirmed.

A method of evaluating personal characteristics using the evaluation system for personal characteristics described above will hereinafter be described.

First, the user executes an application of the evaluation system for personal characteristics through the mobile terminal 10, for example, a mobile phone, and confirms a plurality of profile information stored in the evaluation target selection unit 110 to select the evaluation target. Specifically, the user may select the evaluation target by comparing the profile information, for example, the profile picture, provided by the evaluation target selection unit 110 with the evaluation target. In this case, the evaluation target selection unit 110 may display profile information of members positioned within a predetermined radius on the basis of the mobile phone 10 of the user using a GPS function of the mobile phone 10.

Next, the user selects a characteristic for an action of the evaluation target through the evaluation item unit 120 including the reference point 121 and the plurality of characteristic items 120a to 120f and gives a score. Specifically, when the user performs a drag from the reference point 121 toward the corresponding characteristic through his/her finger or the touch pen, the characteristic and the score for the evaluation target may be given. In this case, the score gauge G may be changed according to a degree or the number of times of the drag in an item of the corresponding characteristic. In other words, the score may be set to rise as a length of the drag becomes distant from the reference point 121 or the number of time of the drag increases. Therefore, the evaluation item unit 120 may give the corresponding characteristic and the score for the corresponding characteristic with only one drag, and user's convenience may thus be increased. In addition, records evaluated by the evaluation item unit 120 are stored in the data storage unit 130.

In the evaluation system for personal characteristics and the evaluation method thereof according to an embodiment of the present disclosure, the corresponding characteristic and the score may be given by performing the drag from the reference point toward the corresponding characteristic, and the user's convenience may thus be improved.

Only one embodiment for carrying out the evaluation system for personal characteristics and the evaluation method thereof according to the present disclosure has been described hereinabove, the present disclosure is not limited to the embodiment described above, it is to be understood by those skilled in the art that various modifications may be made without departing from the scope and spirit of the present disclosure as claimed in the following claims, and these modification may fall within the scope and spirit of the present disclosure.

What is claimed is:

1. An evaluation system for personal characteristics, comprising:
a mobile terminal, wherein
the mobile terminal comprises:
at least one processor;
a screen; and
at least one memory device that stores:
a first set of instructions that causes the at least one processor to display, on the screen, profile information of members stored in the at least one memory device or a cloud network to select an evaluation target;
a second set of instructions that causes the at least one processor to display, on the screen, a reference point and characteristic items; and
a third set of instructions that causes the at least one processor to store a score of a selected one of the characteristic items in connection with the evaluation target provided by a user, in the mobile terminal as private information,
dragging, on the screen, from the reference point by the user's finger or a touch pen causes the at least one processor to select one of the characteristic items corresponding to an area located in a direction of the dragging, and to determine the score of the selected one of the characteristic items corresponding to a length of the dragging,
the reference point and the characteristic items are disposed at different positions on the screen,
the private information is directly shared between the mobile terminal and another mobile terminal,
the private information is not shared between the mobile terminal and a server, and
public information is shared between the mobile terminal and the server.

2. The evaluation system for personal characteristics of claim 1, wherein the at least one processor determines the score of the selected one of the characteristic items based on a number of times of the dragging.

3. The evaluation system for personal characteristics of claim 1, wherein the second set of instructions further causes the at least one processor to display, on the screen, a memo that is capable of receiving a text input.

4. The evaluation system for personal characteristics of claim 1, wherein the third set of instructions further causes the at least one processor to convert the stored private information into the public information.

5. An evaluation method of an evaluation system for personal characteristics including a mobile terminal, comprising:
causing at least one processor of the mobile terminal to display, on a screen, profile information of members stored in at least one memory device of the mobile terminal or a cloud network of a server to select an evaluation target;
causing the at least one processor to display, on the screen, a reference point and characteristic items; and
causing the at least one processor to store a score of a selected one of the characteristic items in connection with the evaluation target provided by a user in the mobile terminal as private information, wherein
dragging, on the screen, of the mobile terminal from the reference point by the user's finger or a touch pen causes the at least one processor to select one of the characteristic items corresponding to an area located in a direction of the dragging, and to determine the score of the selected one of the characteristic items corresponding to a length of the dragging, the reference point and the characteristic items are disposed at different positions on the screen, the private information is directly shared between the mobile terminal and another mobile terminal, the private information is not shared between the mobile terminal and the server, and public information is shared between the mobile terminal and the server.

6. An evaluation system for personal characteristics comprising:

a mobile terminal, wherein
the mobile terminal comprises:
at least one processor;
a screen; and
at least one memory device that stores:
a first set of instructions that causes the at least one processor to display, on the screen, profile information of members stored in the at least one memory or a cloud network to select an evaluation target;
a second set of instructions that causes the at least one processor to display, on the screen, a first shape, a second shape, and a third shape overlapping each other, with a reference point and characteristic items being disposed in the first, second, and third shapes; and
a third set of instructions that causes the at least one processor to store a score of a selected one of the characteristic items in connection with the evaluation target provided by the user in the mobile terminal as private information, dragging, on the screen, from the reference point toward one of the characteristic items by the user's input causes the at least one processor to determine the score of the selected one of the characteristic items, the characteristic items include a first characteristic item, a second characteristic item, a third characteristic item, a fourth characteristic item, a fifth characteristic item, and a sixth characteristic item, the first characteristic item is disposed in a non-overlapping area of the first shape, the second characteristic item is disposed in a non-overlapping area of the second shape, the third characteristic item is disposed in a non-overlapping area of the third shape, the fourth characteristic item is disposed in an area in which the first and second shapes overlap each other, the fifth characteristic item is disposed in an area in which the first and third shapes overlap each other, the sixth characteristic item is disposed in an area in which the second and third shapes overlap each other, the reference point is disposed in an area in which all of the first, second, and third shapes overlap each other, the private information is directly shared between the mobile terminal and another mobile terminal, the private information is not shared between the mobile terminal and a server, and public information is shared between the mobile terminal and the server.

7. The evaluation system for personal characteristics of claim 6, wherein the at least one processor determines the score of the selected one of the characteristic items based on a length of the dragging or a number of times of the dragging.

8. The evaluation system for personal characteristics of claim 6, wherein the second set of instructions further causes the at least one processor to display, on the screen, a memo that is capable of receiving a text input.

9. The evaluation system for personal characteristics of claim 6, wherein the third set of instructions further causes the at least one processor to convert stored data into public information.

10. The evaluation system for personal characteristics of claim 6, wherein shapes and sizes of the first, second, and third shapes are substantially identical to each other.

11. The evaluation system for personal characteristics of claim 10, wherein each of the first, second, and third shapes is a circular shape.

* * * * *